United States Patent Office 3,036,128
Patented May 22, 1962

3,036,128
N-ALKENYL-TRIALKOXYBENZAMIDES
Robert B. Moffett, Kalamazoo, Mich., assignor to The Upjohn Company, Kalamazoo, Mich., a corporation of Delaware
No Drawing. Filed July 31, 1961, Ser. No. 127,893
4 Claims. (Cl. 260—559)

This invention pertains to novel chemical compounds, and more particularly, it relates to novel N-alkenyl-trialkoxybenzamides represented by the following structural formula

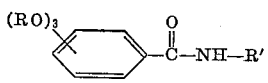

wherein R is lower-alkyl of from 1 to 3 carbon atoms, inclusive, i.e., methyl, ethyl, n-propyl, and isopropyl; and R' is lower alkenyl of from 3 to 4 carbon atoms, inclusive, i.e., allyl, methallyl, 1-methylallyl, 3-butenyl, and crotyl.

The N-alkenyl-trialkoxybenzamides of this invention (Formula I, above) possess valuable pharmacologic activities. The compounds are active and useful as muscle relaxants and tranquilizers.

The novel N-alkenyl-trialkoxybenzamides having Formula I, above, can be readily prepared by methods known in the art for preparing benzamides, for example, by reacting a trialkoxybenzoic acid represented by the formula:

wherein R is as defined above, with thionyl chloride to obtain the corresponding trialkoxybenzoyl chloride, and then obtaining the amide by reacting the trialkoxybenzoyl chloride with an alkenylamine represented by the formula:

wherein R' is as defined above.

The trialkoxybenzoic acids having Formula II, above, many of which are known, can be prepared by methods which are recorded in the literature; see for example, Rabjohn et al., J. Org. Chem. 22, 896–897, 1957. Some of the trialkoxybenzoic acids are available commercially, for example, 3,4,5-trimethoxybenzoic acid and 3,4,5-triethoxybenzoic acid; 3,4,5-trimethoxybenzoyl chloride is also available commercially. The alkenylamines having Formula III, above, i.e., allylamine, methallylamine, 3-butenylamine, crotylamine, and 1-methylallylamine are known compounds.

The trialkoxybenzoyl chloride and the alkenylamine are reacted alone or in the presence of an inert solvent. Suitable solvents include benzene, diethyl ether, dioxane, toluene, and the like, or mixtures thereof. Stoichiometrically, the reaction requires one mole of amine for each mole of acid halide. However, the reaction releases one mole of hydrogen chloride; so an excess of amine, preferably at least one mole excess, should be provided. In lieu of an excess of the amine, another suitable acid acceptor, for example, triethylamine, pyridine, picoline, sodium hydroxide, and the like can be utilized. The reaction can be carried out at temperatures in the range of about 0° to about 100° C. or up to the reflux temperature of the solvent. The N-alkenyl-trialkoxybenzamide product is recovered by conventional methods, for example, filtering, washing to remove amine salts, and recrystallization.

When used in therapy, the novel N-alkenyl-trialkoxybenzamides of the invention can be formulated, as the essential active ingredient, in novel unit dosage compositions for administration via oral or parenteral routes. Suitably, the compositions comprise the essential active ingredient and a solid or fluid pharmaceutical carrier. Convenient solid pharmaceutical carriers for solid compositions include, e.g., cornstarch, lactose, dicalcium phosphate, terra alba (calcium sulfate), talc, stearic acid, magnesium stearate, gums, and functionally similar materials. Suitable solid compositions include tablets, pills, capsules, granules, powders, wafers, and cachets. Fluid pharmaceutical carriers for fluid compositions advantageously comprise water; oils, for example, cottonseed oil, sesame oil, and peanut oil; and oil-water emulsions. Appropriate fluid compositions include solutions, suspensions, syrups, oil-water emulsions, and the like.

By virtue of their muscle relaxant and tranquilizing properties, the novel N-alkenyl-trialkoxybenzamides of the invention are useful for quieting animals; they can be administered to bovines, equines, swine, sheep and goats, poultry, small stock, fishes, beets, and the like to control agitation and prevent physical trauma during transit.

The following examples are illustrative of the process and products of the present invention, but are not to be construed as limiting.

EXAMPLE 1

*Preparation of N-Allyl-3,4,5-Trimethoxybenzamide*

To a solution of 23.1 g. (0.1 mole) of 3,4,5-trimethoxybenzoyl chloride in 250 ml. of absolute ether was added, slowly and in portions, 12.6 g. (0.22 mole) of allylamine. White crystals formed. The reaction mixture was shaken for one hour, ice was added, and the mixture was neutralized with dilute aqueous hydrochloric acid. The crystals were collected on a filter, washed twice with water, and dried in a vacuum desiccator overnight. There was thus obtained 21.2 g. of crude product which melted at 123.5° to 126° C. The crude product was dissolved in 100 ml. of hot ethanol and the solution was filtered while hot. As the solution cooled, white, needle-shaped crystals formed. When thoroughly cooled, the crystals were collected on a filter, washed with cold ethanol, and dried in a vacuum desiccator overnight. There was thus obtained 19 g. (76% yield) of N-allyl-3,4,5-trimethoxybenzamide having a melting point of 122° to 124° C.

*Analysis.*—Calc'd for $C_{13}H_{17}NO_4$: C, 62.14; H, 6.82; N, 5.57. Found: C, 62.31; H, 6.67; N, 5.51.

EXAMPLE 2

*Preparation of N-Methallyl-3,4,5-Trimethoxybenzamide*

Following the procedure of Example 1 but substituting methallylamine for allylamine, there can be prepared the corresponding N-methallyl-3,4,5-trimethoxybenzamide.

EXAMPLE 3

*Preparation of N-Crotyl-3,4,5-Trimethoxybenzamide*

Following the procedure of Example 1 but substituting crotylamine for allylamine, there can be prepared the corresponding N-crotyl-3,4,5-trimethoxybenzamide.

EXAMPLE 4

*Preparation of N-Allyl-3,4,5-Triethoxybenzamide*

Following the procedure of Example 1 but substituting 3,4,5-triethoxybenzoyl chloride for 3,4,5-trimethoxybenzoyl chloride, there can be prepared the corresponding N-allyl-3,4,5-triethoxybenzamide.

EXAMPLE 5
Preparation of N-Allyl-2,3,4-Trimethoxybenzamide

Following the procedure of Example 1 but substituting 2,3,4-trimethoxybenzoyl chloride for 3,4,5-trimethoxybenzoyl chloride, there can be prepared the corresponding N-allyl-2,3,4-trimethoxybenzamide.

EXAMPLE 6
Preparation of N-Allyl-2,3,4-Triethoxybenzamide

Following the procedure of Example 1 but substituting 2,3,4-triethoxybenzoyl chloride for 3,4,5-trimethoxybenzoyl chloride, there can be prepared the corresponding N-allyl-2,3,4-triethoxybenzamide.

EXAMPLE 7
Preparation of N-Allyl-2,4,5-Trimethoxybenzamide

Following the procedure of Example 1 but substituting 2,4,5-trimethoxybenzoyl chloride for 3,4,5-trimethoxybenzoyl chloride, there can be prepared the corresponding N-allyl-2,4,5-trimethoxybenzamide.

EXAMPLE 8
Preparation of N-Allyl-2,4,5-Triethoxybenzamide

Following the procedure of Example 1 but substituting 2,4,5-triethoxybenzoyl chloride for 3,4,5-trimethoxybenzoyl chloride, there can be prepared the corresponding N-allyl-2,4,5-triethoxybenzamide.

EXAMPLE 9
Preparation of N-Allyl-2,4,6-Trimethoxybenzamide

Following the procedure of Example 1 but substituting 2,4,6-trimethoxybenzoyl chloride for 3,4,5-trimethoxybenzoyl chloride, there can be prepared the corresponding N-allyl-2,4,6-trimethoxybenzamide.

EXAMPLE 10
Preparation of N-Allyl-2,3,5-Trimethoxybenzamide

Following the procedure of Example 1 but substituting 2,3,5-trimethoxybenzoyl chloride for 3,4,5-trimethoxybenzoyl chloride, there can be prepared the corresponding N-allyl-2,3,5-trimethoxybenzamide.

EXAMPLE 11
Preparation of N-(3-Butenyl)-4-Ethoxy-3,5-Dimethoxybenzamide

Following the procedure of Example 1 but substituting 4-ethoxy-3,5-dimethoxybenzoyl chloride for 3,4,5-trimethoxybenzoyl chloride and substituting 3-butenylamine for allylamine, there can be prepared the corresponding N-(3-butenyl)-4-ethoxy-3,5-dimethoxybenzamide.

EXAMPLE 12
Preparation of N-Allyl-2,3-Diethoxy-4-Methoxybenzamide

Following the procedure of Example 1 but substituting 2,3-diethoxy-4-methoxybenzoyl chloride for 3,4,5-trimethoxybenzoyl chloride, there can be prepared the corresponding N-allyl-2,3-diethoxy-4-methoxybenzamide.

EXAMPLE 13
Preparation of N-Allyl-2,6-Diethoxy-4-Methoxybenzamide

Following the procedure of Example 1 but substituting 2,6-diethoxy-4-methoxybenzoyl chloride for 3,4,5-trimethoxybenzoyl chloride, there can be prepared the corresponding N-allyl-2,6-diethoxy-4-methoxybenzamide.

EXAMPLE 14
Preparation of N-Allyl-4-Ethoxy-2,5-Dimethoxybenzamide

Following the procedure of Example 1 but substituting 4-ethoxy-2,5-dimethoxybenzoyl chloride for 3,4,5-trimethoxybenzoyl chloride, there can be prepared the corresponding N-allyl-4-ethoxy-2,5-dimethoxybenzamide.

EXAMPLE 15
Preparation of N-Allyl-5-Ethoxy-2,4-Dimethoxybenzamide

Following the procedure of Example 1 but substituting 5-ethoxy-2,4-dimethoxybenzoyl chloride for 3,4,5-trimethoxybenzoyl chloride, there can be prepared the corresponding N-allyl-5-ethoxy-2,4-dimethoxybenzamide.

EXAMPLE 16
Preparation of N-Allyl-2,3,6-Trimethoxybenzamide

Following the procedure of Example 1 but substituting 2,3,6-trimethoxybenzoyl chloride for 3,4,5-trimethoxybenzoyl chloride, there can be prepared the corresponding N-allyl-2,3,6-trimethoxybenzamide.

EXAMPLE 17
Preparation of N-Allyl-2,4-Diethoxy-3-Methoxybenzamide

Following the procedure of Example 1 but substituting 2,4-diethoxy-3-methoxybenzoyl chloride for 3,4,5-trimethoxybenzoyl chloride, there can be prepared the corresponding N-allyl-2,4-diethoxy-3-methoxybenzamide.

EXAMPLE 18
Preparation of N-Allyl-2,5-Diethoxy-6-Methoxybenzamide

Following the procedure of Example 1 but substituting 2,5-diethoxy-6-methoxybenzoyl chloride for 3,4,5-trimethoxybenzoyl chloride, there can be prepared the corresponding N-allyl-2,5-diethoxy-6-methoxybenzamide.

EXAMPLE 19
Preparation of N-Allyl-2-Ethoxy-4,6-Dimethoxybenzamide

Following the procedure of Example 1 but substituting 2-ethoxy-4,6-dimethoxybenzoyl chloride for 3,4,5-trimethoxybenzoyl chloride, there can be prepared the corresponding N-allyl-2-ethoxy-4,6-dimethoxybenzamide.

EXAMPLE 20
Preparation of N-Allyl-3-Ethoxy-2,4-Dimethoxybenzamide

Following the procedure of Example 1 but substituting 3-ethoxy-2,4-dimethoxybenzoyl chloride for 3,4,5-trimethoxybenzoyl chloride, there can be prepared the corresponding N-allyl-3-ethoxy-2,4-dimethoxybenzamide.

EXAMPLE 21
Preparation of N-(1-Methylallyl)-3,4,5-Tri-n-Propoxybenzamide

Following the procedure of Example 1 but substituting 3,4,5-tri-n-propoxybenzoyl chloride for 3,4,5-trimethoxybenzoyl chloride and substituting 1-methylallylamine for allylamine, there can be prepared the corresponding N-(1-methylallyl)-3,4,5-tri-n-propoxybenzamide.

EXAMPLE 22
Preparation of N-Allyl-2,4-Diethoxy-6-Methoxybenzamide

Following the procedure of Example 1 but substituting 2,4-diethoxy-6-methoxybenzoyl chloride for 3,4,5-trimethoxybenzoyl chloride, there can be prepared the corresponding N-allyl-2,4-diethoxy-6-methoxybenzamide.

EXAMPLE 23
Preparation of N-Allyl-2-Ethoxy-3,4-Dimethoxybenzamide

Following the procedure of Example 1 but substituting 2-ethoxy-3,4-dimethoxybenzoyl chloride for 3,4,5-trimethoxybenzoyl chloride, there can be prepared the corresponding N-allyl-2-ethoxy-3,4-dimethoxybenzamide.

EXAMPLE 24

*Preparation of N-Allyl-4-Ethoxy-2,6-Dimethoxybenzamide*

Following the procedure of Example 1 but substituting 4-ethoxy-2,6-dimethoxybenzoyl chloride for 3,4,5-trimethoxybenzoyl chloride, there can be prepared the corresponding N-allyl-4-ethoxy-2,6-dimethoxybenzamide.

EXAMPLE 25

*Preparation of N-Allyl-3,4,5-Triisopropoxybenzamide*

Following the procedure of Example 1 but substituting 3,4,5-triisopropoxybenzoyl chloride for 3,4,5-trimethoxybenzoyl chloride, there can be prepared the corresponding N-allyl-3,4,5-triisopropoxybenzamide.

EXAMPLE 26

Ten thousand (10,000) scored tablets for oral use, each containing 400 mg. of N-allyl-3,4,5-trimethoxybenzamide are prepared from the following ingredients:

|  | Grams |
|---|---|
| N-allyl-3,4,5-trimethoxybenzamide | 4000 |
| Starch, U.S.P. | 170 |
| Talc, U.S.P. | 130 |
| Lactose, U.S.P. | 2600 |
| Sucrose powder, U.S.P. | 37 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of 1 to 2 tablets 2 to 4 times daily.

I claim:
1. Compound of the formula

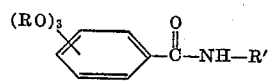

wherein R is lower-alkyl of from 1 to 3 carbon atoms, inclusive, and R' is lower-alkenyl of from 3 to 4 carbon atoms, inclusive.
2. N-allyl-3,4,5-trimethoxybenzamide.
3. N-methallyl-3,4,5-trimethoxybenzamide.
4. N-crotyl-3,4,5-trimethoxybenzamide.

References Cited in the file of this patent

UNITED STATES PATENTS

| 2,870,145 | Perron | Jan. 20, 1959 |
| 2,870,146 | Perron | Jan. 20, 1959 |
| 2,987,544 | Harrom | June 6, 1961 |